United States Patent
Swaggart

(10) Patent No.: US 11,672,323 B2
(45) Date of Patent: *Jun. 13, 2023

(54) SHOULDER SLING WITH MEANS FOR ANCHORING EQUIPMENT

(71) Applicant: Matthew Swaggart, Tulsa, OK (US)

(72) Inventor: Matthew Swaggart, Tulsa, OK (US)

(73) Assignee: Holdfast Gear, LLC, Tulsa, OK (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/356,415

(22) Filed: Jun. 23, 2021

(65) Prior Publication Data

US 2021/0315364 A1 Oct. 14, 2021

Related U.S. Application Data

(63) Continuation of application No. 16/792,416, filed on Feb. 17, 2020, now Pat. No. 11,044,985, which is a continuation-in-part of application No. 16/056,697, filed on Aug. 7, 2018, now Pat. No. 10,561,226.

(51) Int. Cl.
A45F 3/14 (2006.01)
A45F 3/12 (2006.01)
A45F 5/02 (2006.01)

(52) U.S. Cl.
CPC .................. *A45F 3/14* (2013.01); *A45F 3/12* (2013.01); *A45F 5/021* (2013.01); *A45F 2003/142* (2013.01); *A45F 2200/0533* (2013.01)

(58) Field of Classification Search
CPC ........ A45F 3/14; A45F 2003/045; A45F 3/12; A45F 5/021; A45F 2003/142; A45F 2200/0533; Y10S 224/908; A44B 11/18
See application file for complete search history.

(56) References Cited

U.S. PATENT DOCUMENTS

| | | |
|---|---|---|
| 3,919,615 A | 11/1975 | Niecke |
| 3,938,166 A | 2/1976 | Sloop |
| 4,033,488 A | 7/1977 | Brewer |
| 4,091,974 A | 5/1978 | McClintock |
| 4,320,863 A | 3/1982 | Lyer et al. |
| 4,328,917 A | 5/1982 | Reeberg |
| 4,386,724 A | 6/1983 | Kotler |

(Continued)

FOREIGN PATENT DOCUMENTS

DE 202010016350 U1 2/2011

*Primary Examiner* — Brian D Nash
(74) *Attorney, Agent, or Firm* — Cherskov Flaynik & Gurda, LLC

(57) ABSTRACT

A leash is described. It includes a length of strap extending between a first and a second end along a longitudinal axis. The strap is folded along the longitudinal axis to form a loop. The leash also includes a strap length adjustment mechanism attached to the strap intermediate the loop and a terminating end of the strap, wherein the terminating end is attached to attachment hardware configured to reversibly receive a collar of an animal. The adjustment mechanism has a length fixing configuration and an adjustment configuration, wherein the length fixing configuration is configured to prevent changes in the lengths of the loop of strap and the length of slack strap, and wherein the adjustment configuration is configured to allow for adjustment of the diameter of the loop of strap and the length of slack strap.

19 Claims, 17 Drawing Sheets

(56) References Cited

U.S. PATENT DOCUMENTS

| | | |
|---|---|---|
| 4,461,411 A | 7/1984 | Harrow |
| 4,751,923 A | 6/1988 | Marino |
| 4,863,083 A | 9/1989 | Chen |
| D309,359 S | 7/1990 | Joachim |
| D342,348 S | 12/1993 | Panarelli |
| D342,563 S | 12/1993 | Tukiendorf |
| 5,477,998 A | 12/1995 | Reckler |
| 5,802,756 A | 9/1998 | Hightower |
| 6,192,835 B1 * | 2/2001 | Calhoun ............... A01K 27/003 119/792 |
| 6,311,884 B1 | 11/2001 | Johnson |
| 6,371,346 B1 | 4/2002 | Sharma |
| 7,980,771 B2 | 7/2011 | Chamberlayne |
| D683,384 S | 5/2013 | Swaggart |
| D739,085 S | 9/2015 | Tadeo |
| D757,844 S | 5/2016 | Swaggart |
| D794,110 S | 8/2017 | Swaggart |
| D816,759 S | 5/2018 | Swaggart |
| 10,216,069 B2 | 2/2019 | Nguyen |
| 2007/0257072 A1 | 11/2007 | Pena et al. |
| 2008/0203127 A1 | 8/2008 | Castillo-Garrison |
| 2008/0217371 A1 | 9/2008 | Wemmer |
| 2011/0031288 A1 * | 2/2011 | Schultz .................. A45F 3/14 224/103 |
| 2011/0042430 A1 | 2/2011 | Scicluna |
| 2012/0061439 A1 | 3/2012 | Wallis |
| 2013/0233902 A1 | 9/2013 | Henry et al. |
| 2014/0050468 A1 | 2/2014 | Henry et al. |
| 2014/0103084 A1 | 4/2014 | Hale et al. |
| 2014/0346199 A1 | 11/2014 | Golob et al. |
| 2015/0016813 A1 | 1/2015 | Swaggart |
| 2016/0262526 A1 * | 9/2016 | Gonzalez ................ A45F 5/00 |
| 2016/0363838 A1 | 12/2016 | Nguyen |
| 2017/0360009 A1 | 12/2017 | Anderson |
| 2018/0259294 A1 | 9/2018 | Smith |
| 2020/0046106 A1 * | 2/2020 | Swaggart ................ A45F 3/12 |
| 2020/0178679 A1 * | 6/2020 | Swaggart ............... A45C 13/30 |
| 2022/0015484 A1 * | 1/2022 | Pagano ................ A44B 11/263 |

* cited by examiner

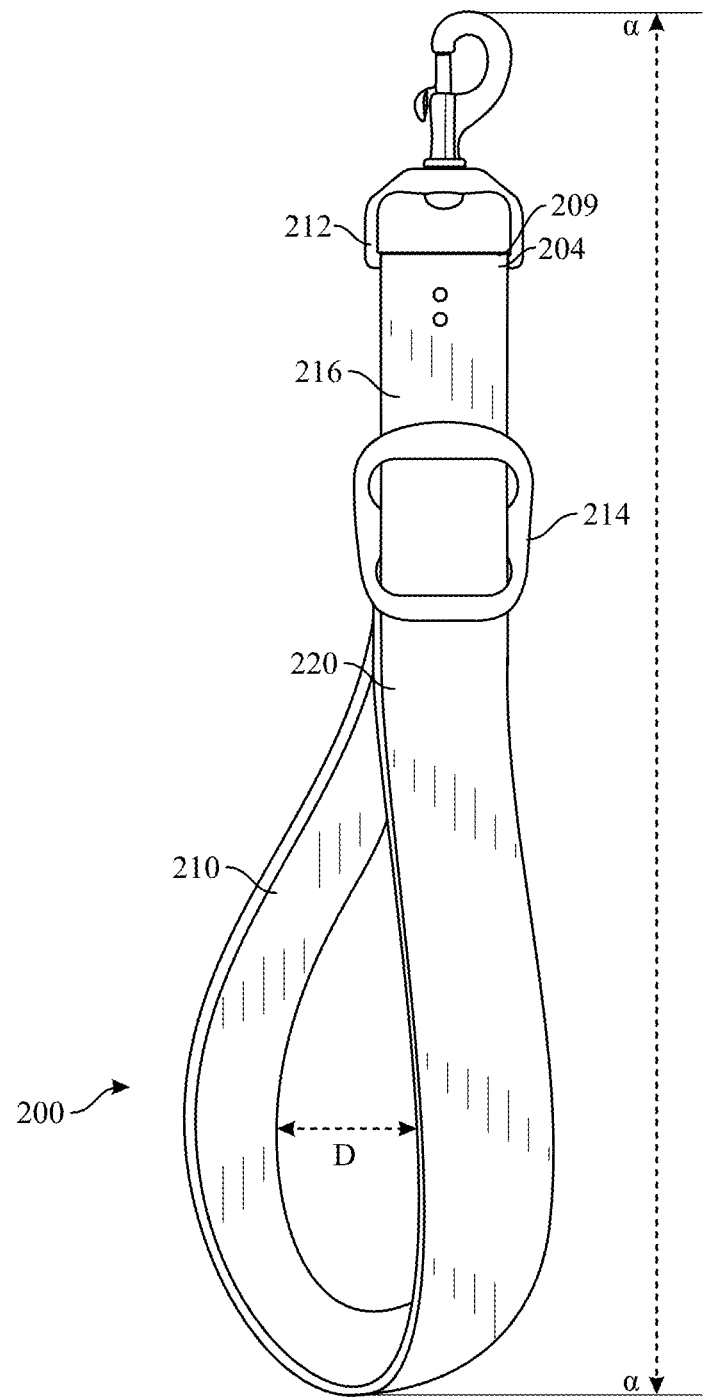
Fig: 2A

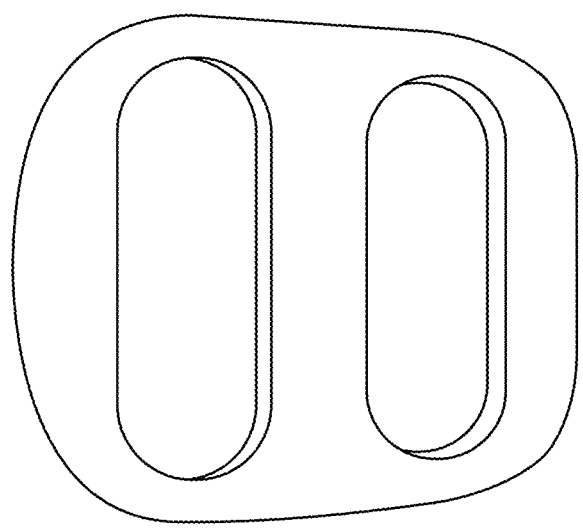
Fig: 2B

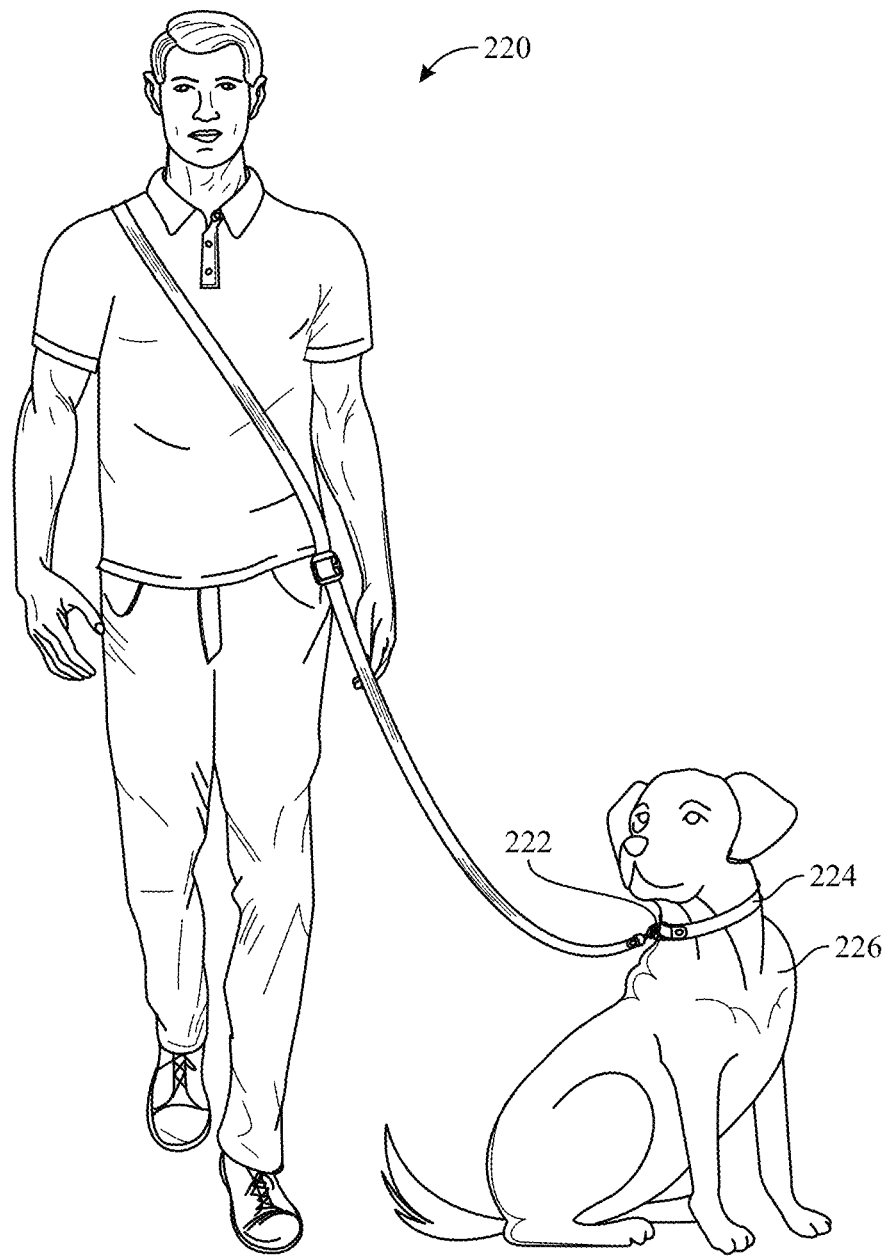
Fig: 2C

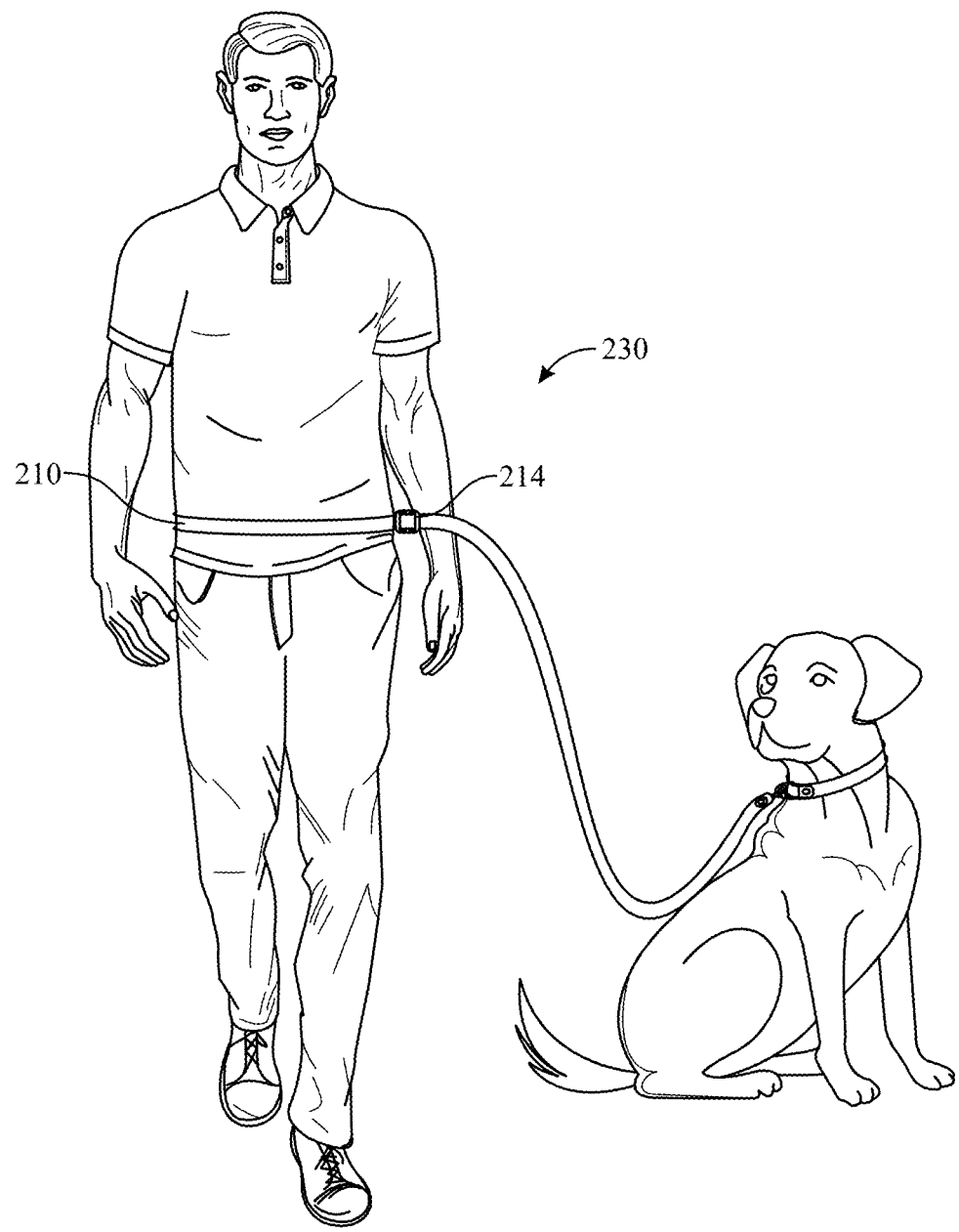
Fig: 2D

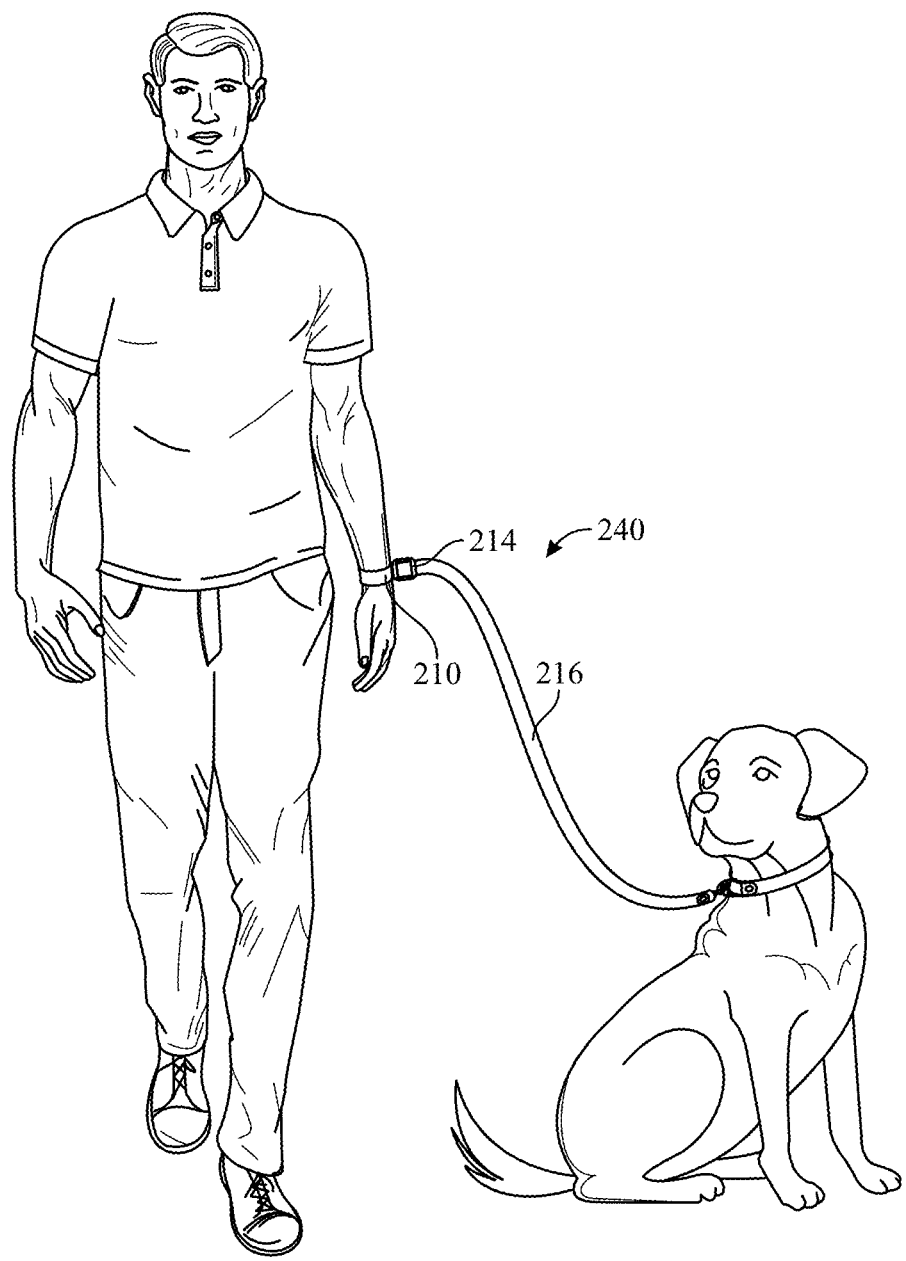
Fig: 2E

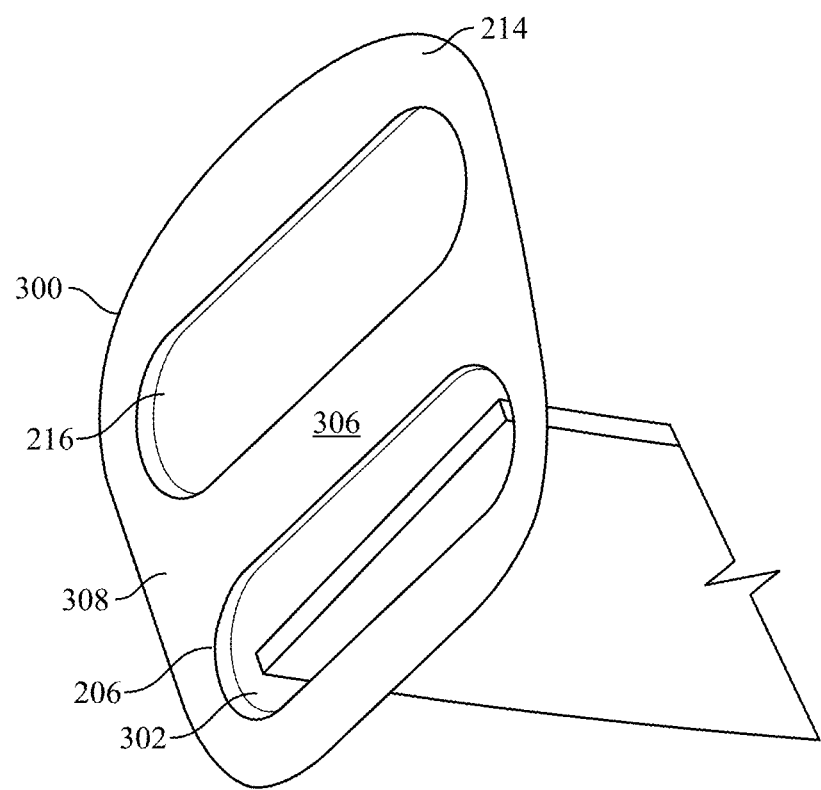
Fig: 3A

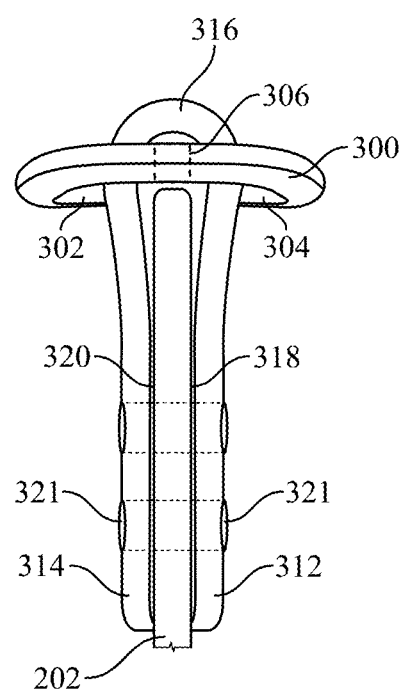
Fig: 3B

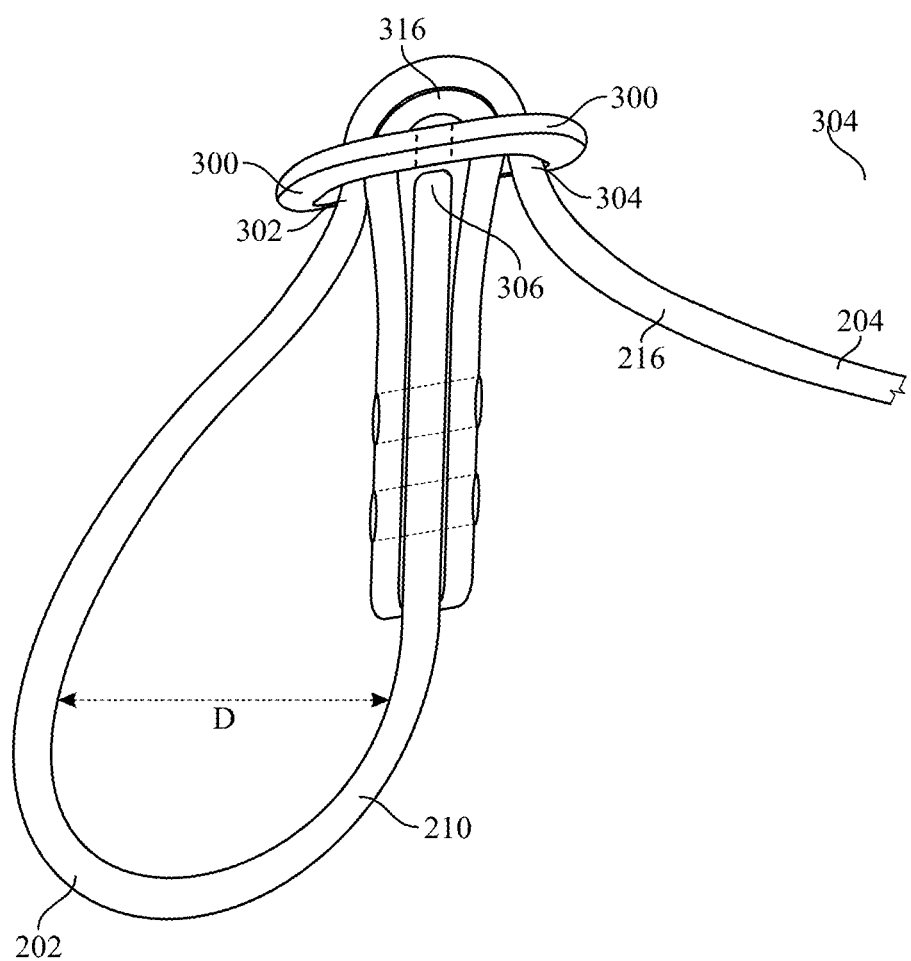
Fig: 3C

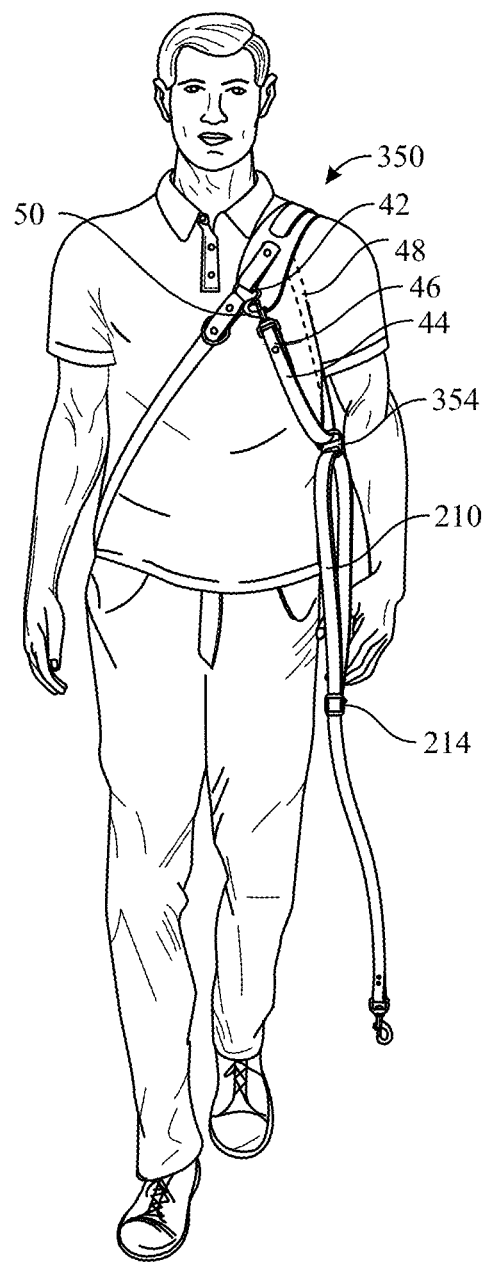
Fig: 4A

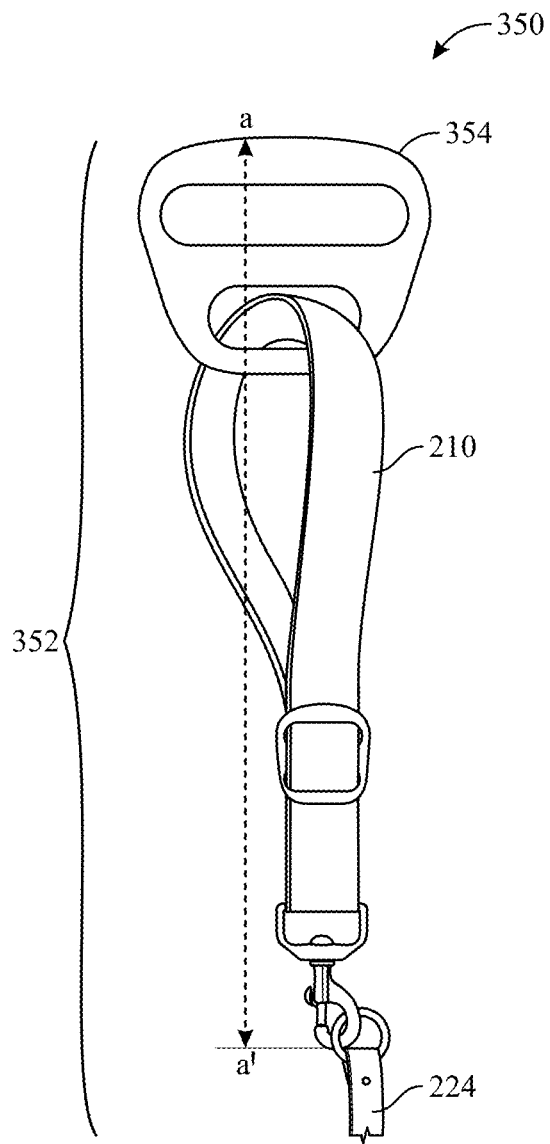
Fig: 4B

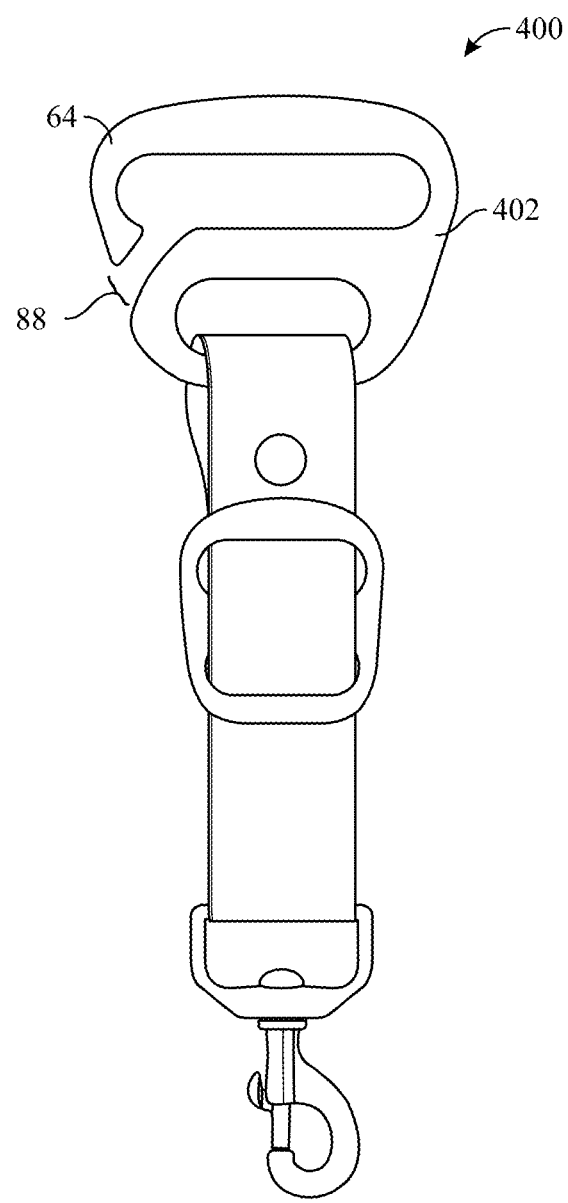
Fig: 5

SHOULDER SLING WITH MEANS FOR ANCHORING EQUIPMENT

PRIORITY

This application claims priority as a continuation of U.S. application Ser. No. 16/792,416, filed on Feb. 17, 2020, presently pending, which was in turn a continuation-in-part of U.S. non-provisional patent application Ser. No. 16/056,697, filed Aug. 7, 2018, issued as U.S. Pat. No. 10,561,226 on Feb. 18, 2020, the entirety of which is incorporated herein by reference.

BACKGROUND OF THE INVENTION

1. Field of the Invention

This invention relates to a shoulder sling for carrying equipment, and more specifically, this invention relates to a camera sling with means to reduce the swinging of a camera during periods of activity.

2. Background of the Invention

Many devices exist for attaching a camera to a user, with slings and harnesses being the most popular currently at the time of this application. State of the art camera slings and harnesses feature camera sliders. These sliders attach slidably to the harness or sling at one end and to a camera at the other. This configuration allows the camera to hang securely and hands-free from a harness or sling while not in use and enables a user to grab the hanging camera and slide it up to a shooting position with no lag time.

The invention of these camera harnesses and slings with camera sliders improved on the convenience of previous carrying devices by providing hands-free carrying of cameras without requiring a user to detach a camera from the carrying device before shooting. With the freedom of movement of the camera sliders offered by these state of the art slings and harnesses also came a disadvantage. As the camera sliders allow easy movement along the length of a camera sling and harness, the cameras tend to swing and bounce during periods of high activity of a user, representing danger to the attached cameras and accessories. This is especially true for photographers who are walking or hiking uneven terrain in pursuit of a subject or otherwise following the movements of an active subject.

Thus, a need exists in the art for a system for reversibly anchoring cameras attached to a camera sling or harness to reduce camera movement while not in use. Ideally, the apparatus would reduce the movement of a hanging camera while not in use but allow for quick release to a shooting position.

Similarly, many leash systems and methods exist for limiting the range of mobility of dogs and other animals. Handheld leashes are the most popular variety of leash with state of the art leashes having various modifications for convenience and comfort. However, state of the art leashes are little more than lengths of strap that reversibly attach to the collar of an animal. These leashes do not take into account that a user may have the need or the desire for the use of both of their hands while still keeping the leashed animal near them.

Thus, a need exists in the art for an animal leash system that serves the same purpose of state of the art leashes without the need to require the use of one or both of a user's hands. Ideally, the leash system would limit the movement of a dog or animal away from a user while allowing free movement of a user's hands.

SUMMARY OF INVENTION

An object of the invention is to provide an apparatus for reversibly limiting the movement of a camera hanging from a camera sling to overcome the disadvantages of the prior art.

Another object of the present invention is to provide an apparatus for quickly and reversibly limiting the movement of a camera hanging from a camera sling on camera sliders. A feature of the invention is an anchoring means featured on or near the waste of a user. An advantage of the apparatus is that its proximity to an inactive camera hanging from a camera sling allows for rapid attachment and detachment of the anchoring means to the camera.

Another object of the present invention is to provide a means for limiting the movement of a camera hanging on a camera slider from a camera harness without need for complicated or awkward camera positioning. A feature of the invention is that the anchoring means can quickly and easily be attached to a hanging camera with minimal movement of the camera. An advantage of the invention is that this rapid attachment allows a user to begin active movements following a subject without wasting time awkwardly positioning a camera into a stable position. Similarly, an advantage of the invention is rapid detachment of the anchoring means from a hanging camera. A feature of the invention is that one hand movement can release the anchoring means and release the camera to a free-shooting configuration.

Yet another object of the present invention is to provide a robust and durable anchoring means for a camera suspended on a camera slider. A feature of the invention is the use of durable and tough materials in the construction of the anchoring means. An advantage of the invention is that the anchoring means strongly resists movement by an anchored camera.

Still yet another object of the present invention is to provide multiple anchoring means to a camera suspended on a camera slider. A feature of the invention is a strap that can be used either as a stabilizing strap for a camera sling by encircling the arm of a user and attaching to the sling or an anchoring means by attaching to a hanging camera. An advantage of the invention is that the user can configure the invented camera sling to be in a stable, photo-shooting configuration or quickly convert to an active movement, camera anchoring configuration.

A further advantage of the invention is that the camera does not have to be manipulated into a specific or complicated position to utilize the anchoring means. Yet another advantage of the invention is that the anchoring means can be integrally integrated into the belt of a user or in an alternative embodiment can be reversibly detachable to the belt or belt loop of a user.

An object of the invention is to provide an apparatus for limiting the movement of a dog or animal away from a user without requiring that a user hold the apparatus. A feature of the invention is a leash that can be anchored to a portion of the user's body other than their hands. An advantage of the invention is that a user's dog or another animal can be anchored to them without encumbering their hands.

Another object of the invention is to provide a leash that is adjustable. A feature of the invention is an adjustment mechanism that allows for adjustment of the invented leash for wearing in various positions on a user's body. An advantage of the invention is that a single leash is provided that can be adjusted to be worn in various positions based on the needs of a user at a particular time to reflect a particular preference.

Yet another object of the invention is to provide a leash attachment that can be added to various anchoring mechanisms. A feature of the invention is its means for reversible attachment to existing anchoring mechanisms. An advantage of the invention is that the leash attachment can be temporarily added to an existing anchor point and removed at a later time. An additional advantage is that multiple leash attachments can be added to an existing anchor point.

Briefly, the invention provides An equipment sling with anchor point comprising: a first strap configured to overlay a shoulder of a user and extend downwardly across a front and back of said user toward a hip of the user opposite the overlaid shoulder; a secondary strap having a first end and a second end, wherein the first end is in slidable communication with the first strap along a first length of the first strap, and wherein the second end comprises means for reversibly fixing the secondary strap to said equipment; and an anchoring mechanism reversibly attached to the second end of the secondary strap such that the first end of the secondary strap is in slidable communication along a second length of the first strap, wherein the second length is shorter than the first length.

Also provided is a method for limiting movement of equipment suspended from a sling comprising: providing a shoulder sling having a primary strap configured to overlay a shoulder of a user and extend downwardly across a front and back of said user toward a hip of the user opposite the overlaid shoulder and equipment suspended from said primary strap by a secondary strap, wherein the secondary strap is in slidable communication with the primary strap; providing an anchoring mechanism that reversibly limits a range of movement of the secondary strap along the primary strap when the anchoring mechanism is reversibly attached to the secondary strap; and reversibly attaching said anchoring mechanism to said secondary strap.

The invention also provides A leash comprising: a length of strap extending between a first and second end along a longitudinal axis, wherein the strap is folded along said longitudinal axis to form a loop of strap having a diameter; a strap length adjustment mechanism attached to the strap intermediate the loop and a terminating end of the strap, wherein the terminating end is attached to attachment hardware configured to reversibly receive a collar of an animal; and a length of slack strap extending between the adjustment mechanism and the terminating end.

Still further is provided A wearable leash comprising: a first strap configured to overlay a shoulder of a user and extend downwardly across a front and back of said user toward a hip of the user opposite the overlaid shoulder; a first attachment point positioned on the first strap where the first strap overlays an anterior portion of the user's shoulder; a second attachment point positioned on the first strap where the first strap overlays a posterior portion of the user's shoulder; a stabilizing strap having a length extending between a first end and a second end, wherein each end of the stabilizing strap comprises a clip, wherein the clips are reversibly attached to the attachment points on the first strap; and a leash attachment attached to the stabilizing strap such that the leash attachment is in slidable communication along the length of the stabilizing strap, wherein the leash attachment further comprises a terminating end having a means for attaching to a collar of an animal.

BRIEF DESCRIPTION OF THE DRAWINGS

The invention together with the above and other objects and advantages will be best understood from the following detailed description of the preferred embodiment of the invention shown in the accompanying drawings, wherein:

FIG. 2A is a perspective view of an adjustable animal leash, in accordance with the features of the present invention;

FIG. 2B is a perspective view of an exemplary adjustment mechanism for the invented adjustable leash, in accordance with the features of the present invention;

FIGS. 2C-2E depict various embodiments of an adjustable animal leash, in accordance with the features of the present invention;

FIGS. 3A-C depict a schematic showing attachment and use of an adjustment mechanism, in accordance with the features of the present invention;

FIGS. 4A-4B depict an alternative embodiment of an adjustable animal leash, in accordance with the features of the present invention; and FIG. 5 depicts another embodiment of an adjustable animal leash, in accordance with the features of the present invention.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. As stated herein, "slidable communication" between two components means that one component may slide along the longitudinal axis of the other.

The present invention is a novel apparatus for temporarily limiting the movement of a camera suspended from a harness or sling from camera sliders. The device may feature one or both of two different anchoring means at the same time. When in use, the anchoring means can be quickly deployed to limit the movement of a hanging camera while a user is active and can be quickly released to allow the camera to move freely.

While useful for attachment to a camera as shown and described herein, this use is exemplary and not meant to be limiting. The invented apparatus can be used to support any equipment or device that can be hung from a shoulder sling. Such equipment or devices include: binoculars, handbags, grocery bags, guns, water bottles, pet leashes, and tote bags. This list is exemplary and not meant to be limiting.

Device Detail

Figure 1A:
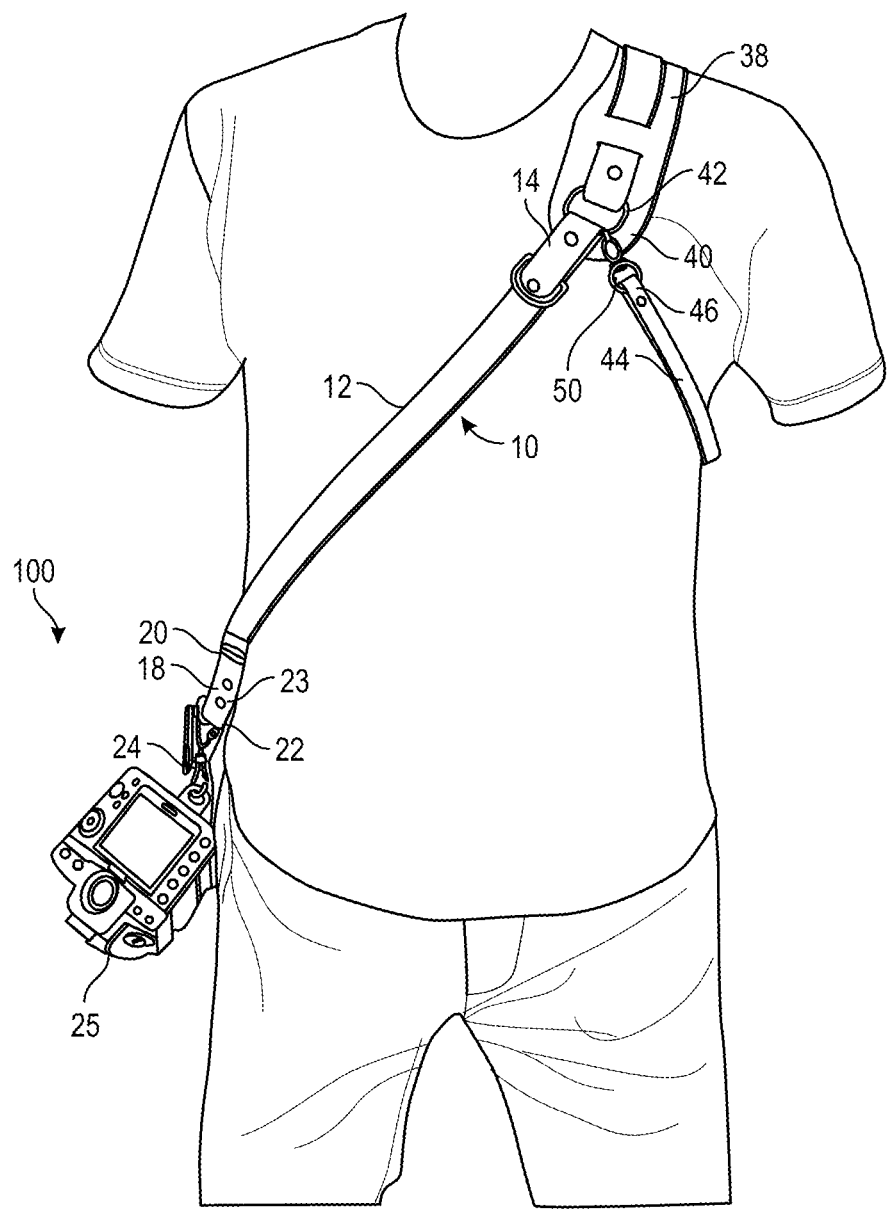
FIG. 1A is a front view of a camera sling having two camera stabilization features, in accordance with the features of the present invention.

An exemplary embodiment of the invented device is shown in FIGS. 1A and B and designated as numeral 10. The device 10 includes a strap 12 extending a length between a first end 14 and a second end 16 (shown in FIG. 1B). When worn by a user, the first end of the strap 14 overlays an anterior portion of the user's shoulder or chest and extends diagonally therefrom toward the hip opposite the overlaid shoulder. The strap 12 then extends diagonally upwardly over the back of the user to its second end 16 that overlays a posterior portion of the user's shoulder or back. At the first and second ends of the 14, 16 of the strap, the strap is reversibly attached to D-Rings 42 that are disposed on both sides of a shoulder pad 38. The length of the strap 12 between its first and second ends can be any length and can be customized to fit any user. Preferably, the length of the strap between its first and second ends is preferably between approximately 24 to approximately 48 inches in length and typically approximately 29 to approximately 39 inches.

In an alternative embodiment, the invented device does not feature the shoulder pad. In this alternative embodiment, hardware such as the aforementioned D-Rings are attached directly to the first strap 14. For example, in this alternative embodiment, D-Rings would be attached to the first strap in the same position overlaying a user's body as they would be if the shoulder pad was present. A person having ordinary skill in the art would readily understand that there are myriad ways to attach such hardware directly to the first strap.

As shown in FIG. 1A, a camera slider 18 depends from the strap 12. The camera slider 18 has a first end 20 and a second end 22, the first end 20 in slidable communication with the length of the strap 12 and the second end 22 reversibly coupled to a camera attachment means 24. The camera attachment means may comprise any reversibly attachable clips that are robust enough to remain attached to a hanging camera. Exemplary clips include quick-detach or quick-release clips, swivel shackles, snap shackles, and combinations thereof.

Figure 1B:
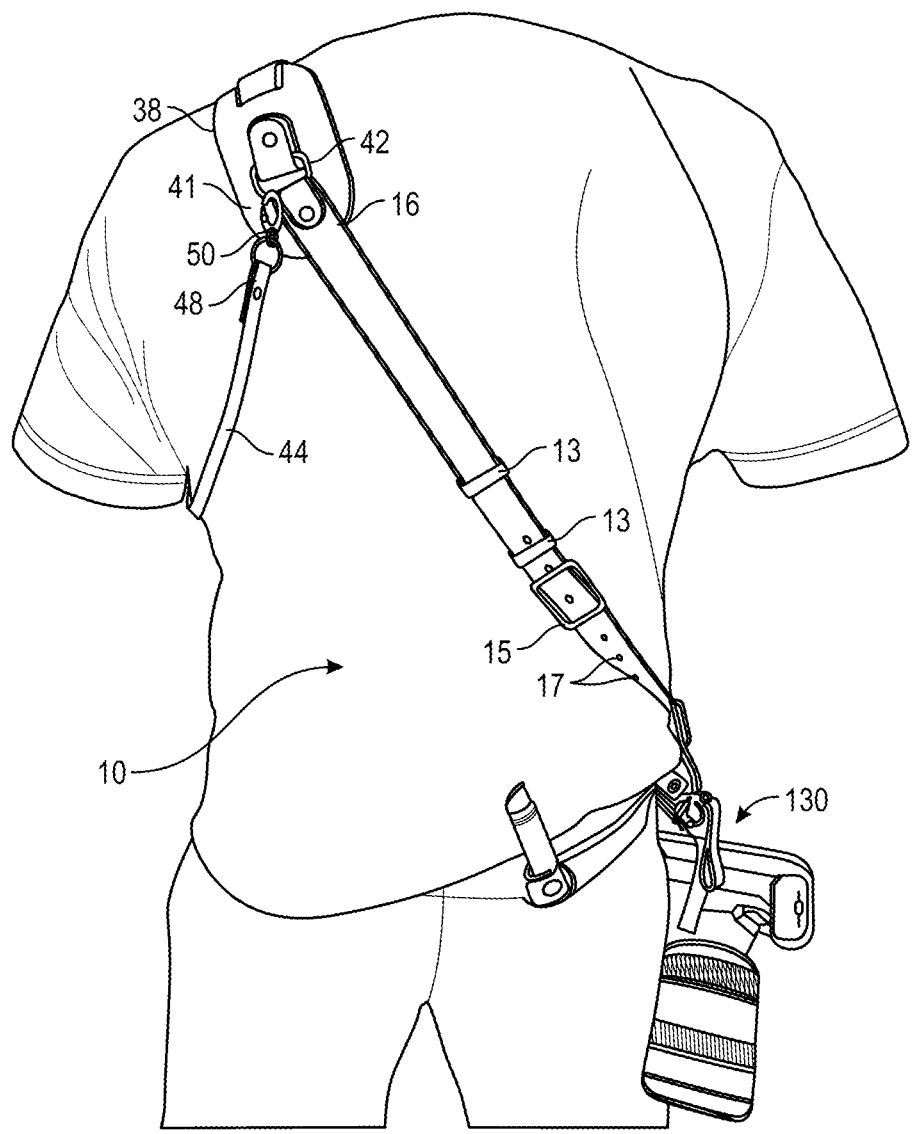
FIG. 1B is a back view of a camera sling having two camera stabilization features, in accordance with the features of the present invention.

In an embodiment, the strap 12 is a single continuous strap. Alternatively, as shown in FIGS. 1A-B, the strap 12 actually comprises two straps that are joined together using apertures 17 in the straps and the buckle 15 as described in U.S. patent application Ser. No. 15/471,163 filed on Mar. 28, 2017, the entirety of which is incorporated by reference herein, in order to provide the ability to adjust the length of the camera sliders. The buckle 15 shown in FIGS. 1A-B is only an exemplary piece of hardware. In alternative embodiments, the buckle 15 may be any piece of hardware suitable for adjusting the length of a strap such as a belt buckle or Conway buckle. The strap 12, may feature belt loops 13 to manage any extra length of strap.

Figure 1C:
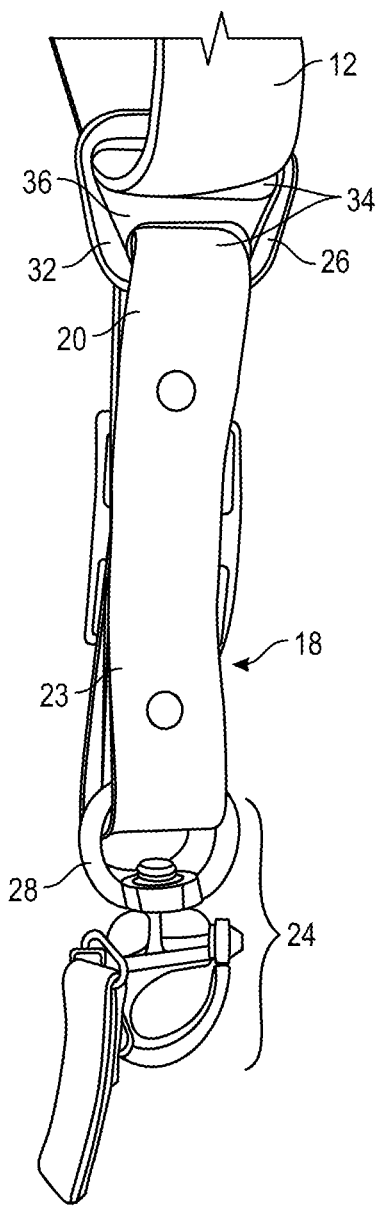
FIG. 1C. is a detail view of a camera slider for a camera sling, in accordance with the features of the present invention.

FIG. 1C is a detail view of a camera slider 18. As shown, the slider 18 comprises a length of a secondary strap 23 that extends between the first 20 and second ends 22 of the slider 18. In this embodiment, the length of strap 23 is a loop of material that is reversibly received by the slider hardware 26 at the first end of the slider 20 and the ring portion 28 of the camera attachment means 24 at the second end of the slider 22. The slider hardware 26 receives both the strap portion 23 of the slider 18 and the larger strap 12 of device. When the slider hardware 26 is in receipt of both the slider strap 23 and the larger strap 12, this places the slider 18 in slidable communication with the strap 12 such that the slider 18 can slide along the length of the larger strap 12 of the device 10. In an embodiment, the camera sliders are fixed in length. The length of the sliders can be customized to any length for any user. Preferably, the sliders are between approximately 2 and approximately 9 inches in length. Typically, the sliders are between approximately 3 and approximately 3 inches in length.

In an embodiment, the sliders 18 feature the apertures and buckle device described in U.S. patent application Ser. No. 15/471,163 filed on Mar. 28, 2017, the entirety of which is incorporated herein, in order to provide the ability to adjust the length of the camera sliders 18.

FIG. 1C shows the slider hardware 26 as a customized ring designed for this use featuring a pentagonally shaped outer ring 32, wherein the interior of the outer ring 32 is divided into two voids 34 by a medially positioned rib 36. Said medial rib 36 prevents friction between the slider strap 23 and the larger strap 12 of the device when the slider slides along the strap. The pentagonal ring shown here is an exemplary piece of hardware that is suitable for use as the slider hardware 26 herein and not meant to be limiting. The slider hardware 26 may be any shape and may have separate voids that respectively receive the larger strap 12 and the slider strap 23. Alternatively, the slider hardware 26 may only feature one void that receives both the larger strap 12 and the slider strap 23. Further, the slider hardware 26 can be made from any robust material that can support the weight of a camera 25. Suitable materials include metal, plastic, wood, and combinations thereof.

As shown in FIG. 1C, the ring portion 28 of the camera attachment means 24 receives the strap portion 23 of the slider 18. The camera attachment means 24 may be any piece of hardware that can reversibly attach to an accessory clip that is received by the tripod port on a camera 25. Suitable accessory clips include any lug and loop accessory clip that screws into the tripod port on a camera 25. Exemplary accessory clips are the holdfast accessory clips sold by Holdfast Gear, LLC of Tulsa Okla. When the invented device is in use, a camera 25 is attached to the camera slider 18 via the attachment means 24. If a user is not using the camera 25 and supporting it with their hands, the camera 25, in a default position, hangs down at a user's side.

Returning to FIGS. 1A-B, the device 10 features a shoulder pad 38 that overlays the shoulder of a user while the device is worn. In the embodiment shown in FIGS. 1A-B, the shoulder pad 38 extends between a first 40 and second end 41. Each end of the shoulder pad 38 features a D-ring 42 to which an end of the strap 12 reversibly attaches. In alternative embodiments, the shoulder pad 38 is a substrate having two apertures such that the strap 12 is received by the apertures such that the shoulder pad encircles the portion of the strap overlaying a user's shoulder.

Looking to FIGS. 1A-B, the device 10 features a stabilizing strap 44. Said stabilizing strap comprises a strap extending between a first end 46 and a second end 48, wherein the first and second ends both comprise clips 50. The clips 50 may comprise any reversibly attachable clips. Exemplary clips include quick-detach or quick-release clips, swivel shackles, snap shackles, and combinations thereof. In the configuration shown in FIGS. 1A-B, the stabilization strap 44 is in its stabilizing configuration wherein the clips 50 of the stabilization strap 44 are reversibly attached to both D-rings 42 on the shoulder pad 38. The stabilizing configuration of the stabilization strap features the stabilization strap 44 extending between the two D-rings 42 and under the arm of the user such that the stabilization strap and shoulder pad encircle the user's arm. In this configuration, the stabilization strap 44 minimizes movement of the whole device while in use.

Figure 1D:
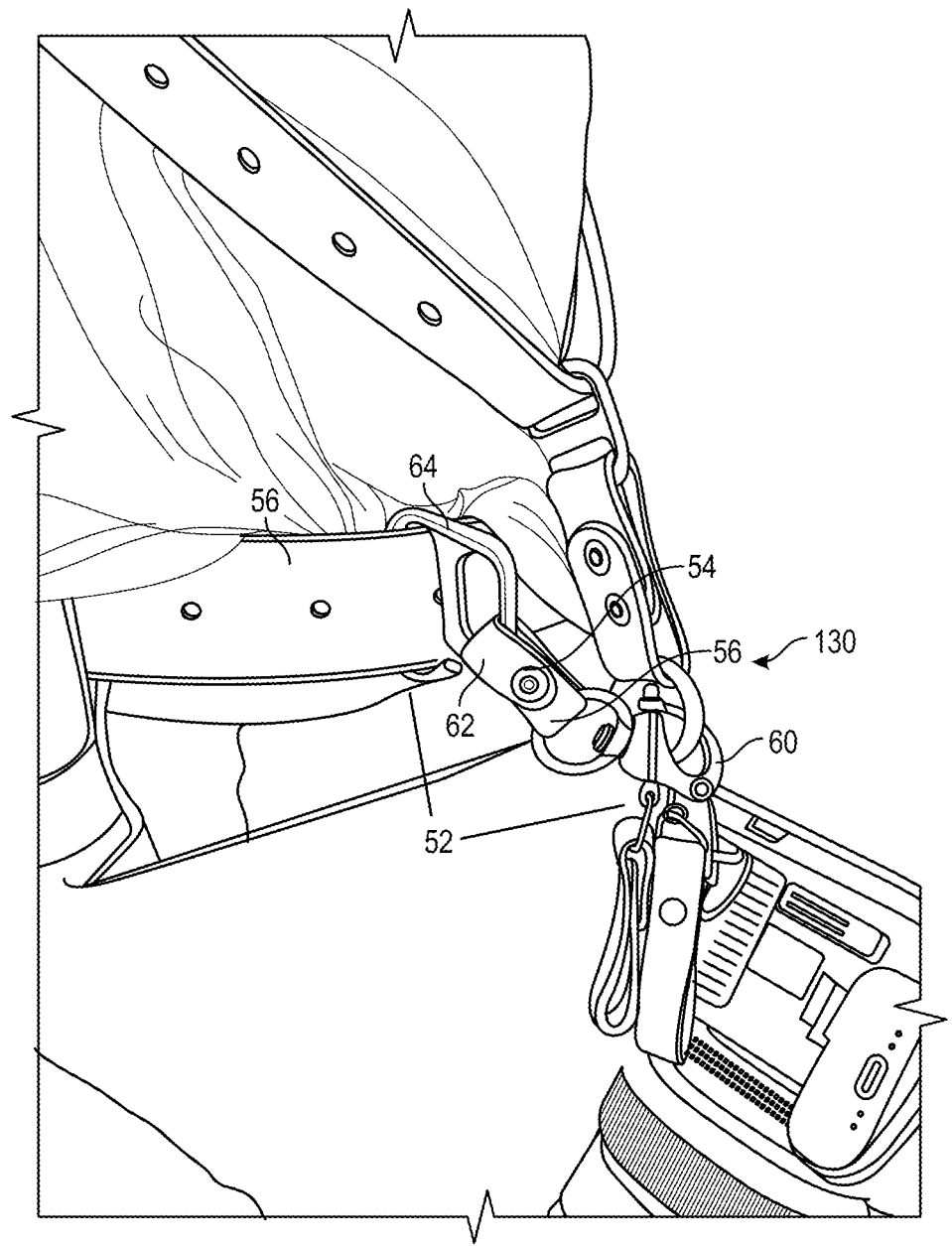
FIG. 1D is a rear view of an embodiment of a camera stabilizing device, in accordance with the features of the present invention.

The device 10 may feature another stabilizing feature 52 shown in FIG. 1D. This stabilizing feature 52 is a strap 54 extending from the belt 56 of a user to a terminal end 58 comprising a clip 60. Said strap 54 has a first end 62 comprising a ring 64 that, is reversibly attachable to a user's belt 56. In an alternative embodiment, the ring 64 at the first end 62 of the stabilizing feature is either integrally included in the belt of a user or reversibly attached to the belt loop of a user.

Figure 1E:
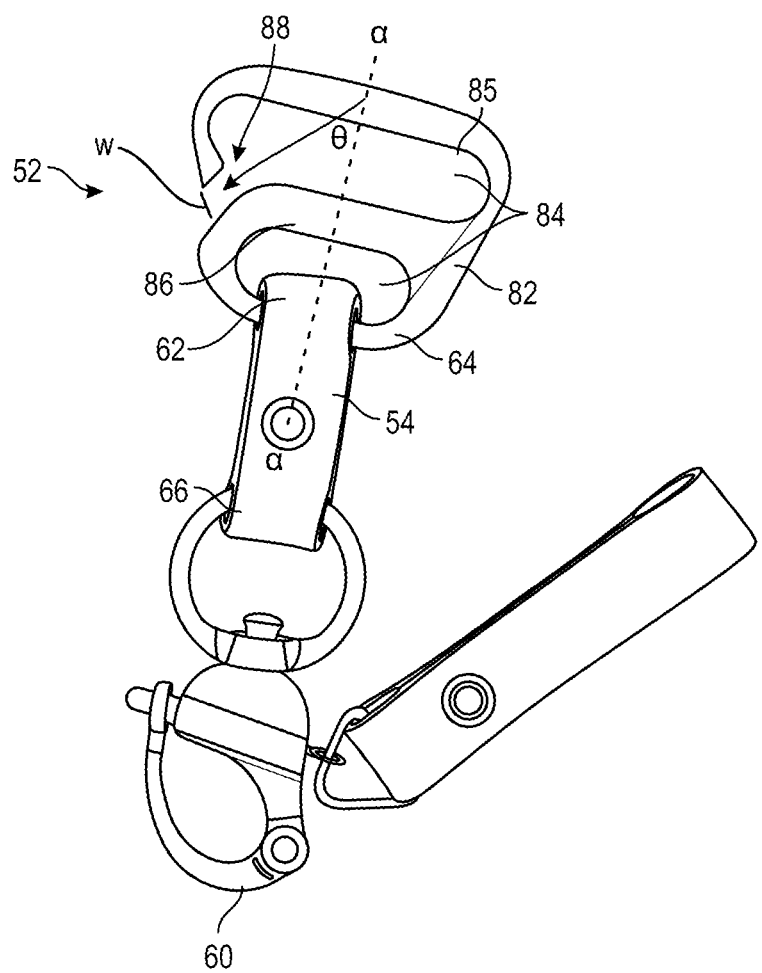
FIG. 1E is a detail view of a waist-mounted camera stabilizing device, in accordance with the features of the present invention.

FIG. 1E is a detail view of the stabilizing feature 52 shown in FIG. 1D. As shown, the stabilizing feature 52 comprises a strap 54 attached at its first end 62 to a waist attachment clip 64 and attached at its second end 66 to a camera attachment means 60. The waist attachment clip 64 is similar to the slider hardware described above in that it features an outer ring 82 whose interior is divided into two voids 84 by a medial rib 86. One of the voids 85 receives the stabilizing feature's strap 54. A portion of the outer ring 82 surrounding the void 85 that receives the strap 54 has a notch 88 that allows for the sliding of an object thinner than the width w of the notch to slide into the notch and into the void 85. The waist attachment clip 64 is designed so that the notch 88 can reversibly receive the fabric of a user's waistband or belt 56. The notch can be made to have any width w to accommodate fabrics or leathers of any kind. Typically, the notch is between approximately ⅛ and approximately ½ inch wide.

The notch 88 extends at an angle θ to the longitudinal axis α of the waist attachment clip 64. The notch is designed to be non-parallel to the longitudinal axis α of waist attachment clip 64 so that once the waist attachment clip 64 is slid over a user's waistband or belt, the received fabric will not slide directly back out of the notch. Similar to the width of the notch, the angle θ can be customized to be any angle and is preferably between approximately 0 and approximately 90 degrees. Typically, the angle θ is between approximately 20 and approximately 45 degrees.

A salient feature of the embodiment shown in FIG. 1E is the ability to utilize it with any existing camera sling or harness wherein a supported camera hangs free when not in use. Using the stabilizing feature shown in FIG. 1E, a user can place the feature on their belt and limit the movement of a camera hanging free from any sling or harness. The stabilizing feature of FIG. 1E is amenable for use with existing systems without any need to modify those existing systems.

All straps discussed herein are made from any suitably robust material. Typical materials include leather, canvas, goretex, nylon, cotton, polyester, rubber, and combinations thereof. The shoulder pad described above is made from similar materials.

Anchoring Detail

Figure 1F:
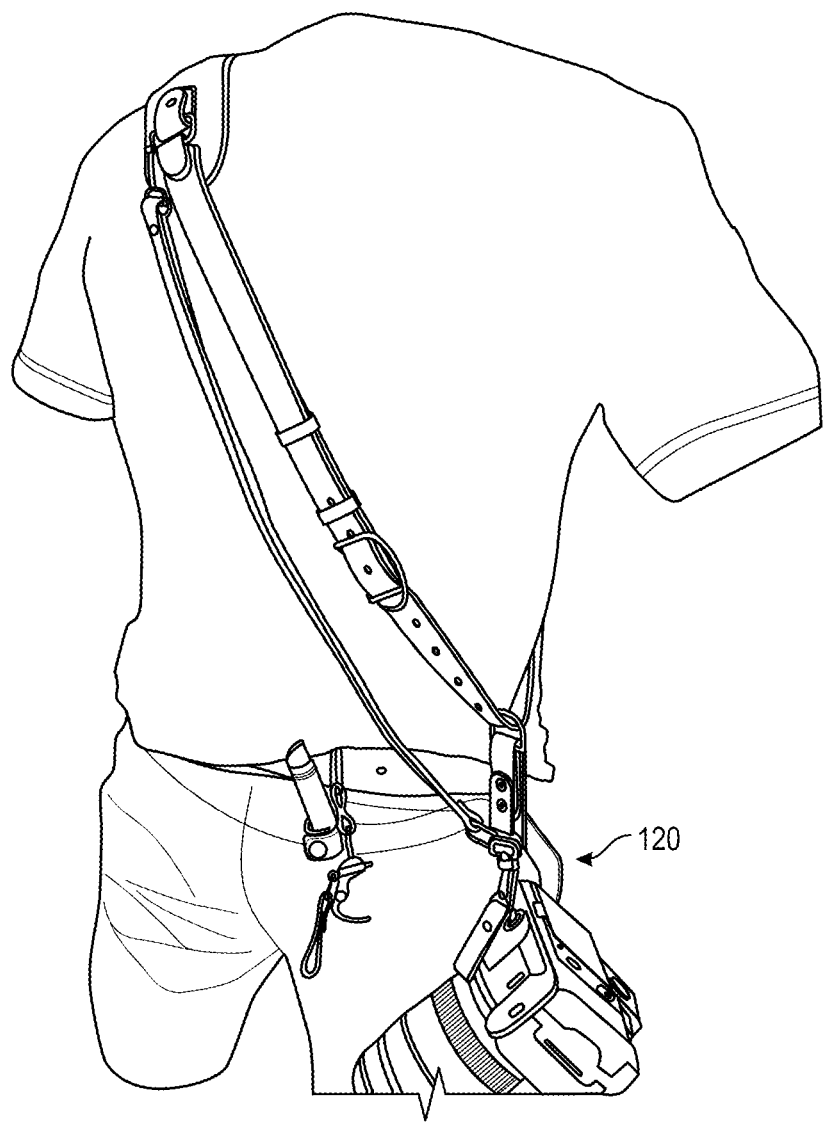
FIG. 1F is a rear view of a camera sling having two camera stabilization features, in accordance with the features of the present invention.

When in use, the device provides a sling 10 configured to suspend a camera 25 secured to a camera slider. The device 10 allows a camera 25 to freely slide along the length of its strap 12 on either end of the shoulder pad shoulder pad 38. In this position 100 as shown in FIG. 1A a user may hold the camera 25 and position it. When the user is not holding the camera 25, it hangs from the device 10 by the slider 18 in a position near a hip of the user. If the user of the device then begins a period of active movement such as walking, running, climbing, or any other activity that would jostle the freely hanging camera 25, he or she may use the stabilization strap 44 of the device to anchor the camera 25 and limit its movement to reach position 120 as shown in FIG. 1F.

In order to reach position 120 from the idle position where the camera 25 hangs free, a user unclips the clip comprising the first end of the stabilization strap from the D-ring 42 on the chest side of the shoulder pad of the device. The user then moves the stabilization strap so that it runs down their back and reversibly clips the free clip of the stabilization strap to the ring of the camera attachment means as shown in FIG. 1F. In position 120, the stabilization strap is a fixed length and therefore limits the movement of the hanging camera.

Once the position of the camera is limited in position 120, the user can then free the camera 25 to be ready-to-shoot by disengaging the clip 50 of the stabilization strap from the ring of the camera attachment means, running the stabilization strap under their arm and re-engaging the stabilization strap's free clip to the chest side D-ring 42. This places the device back into position 100.

Alternatively or in conjunction with the stabilization strap 44, the waist mounted anchoring means 52 can be used to limit the movement of a camera hanging from a camera sling. As shown and discussed above, in position 100, the device provides a camera 25 that is free to slide along the length of the strap on either side of the shoulder pad. Where a user desires to begin active movement, they may attach the belt-mounted stabilizing feature 52 to the ring portion 28 of the camera attachment means 24 to move into the stabilized position 130 as shown in FIGS. 1B and 1D.

In the stabilized configurations shown in FIGS. 1B, D, and F, the stabilizing strap 44 or belt-mounted stabilizing feature 52 limit jostling and movement of the camera while a user actively moves while the camera 25 hangs during walking, hiking, climbing or other active periods. These stabilizing features prevent damage to the camera 25 and accessories by limiting large and fast movements. The stabilizing features further prevent the full weight of a camera and a lens from repeatedly striking the user, preventing potential bruises, irritation, and lacerations.

Both stabilization features shown and discussed above prevent movement of a secured camera 25 (positions 120 and 130) beyond an allowed distance as controlled by the fixed length of either stabilizing feature. Preferably, once the invented device is in a stabilizing configuration (120 and 130), the camera can only move a maximum of between approximately one and approximately six inches away from an idle hanging position. Typically, the camera is not allowed to move more than approximately three inches when in a stabilized configuration. These figures are exemplary and not meant to be limiting. The movement of the camera in a stabilized position can be customized by lengthening the stabilizing features (either the stabilizing strap or the waist-bound stabilizing feature). For example, a photographer using the invented device with a heavy camera/lens configuration may desire that the camera be allowed to move less than the distances cited above. In such a case, the lengths of either stabilizing feature can be customized to achieve the desired movement of the camera in a stabilized configuration.

A salient feature of the invention is the ability to rapidly engage a stabilization feature to a free-hanging camera when minimized swinging of the camera is desired. For example, using any embodiment of the stabilization feature, only one step is needed to engage a free clip on the end of the stabilization means to the camera attachment means of the camera slider. Such an engagement step can be performed rapidly using one hand. Similarly, the stabilization means can be released from the camera attachment means using one hand and one step to release the clip of the stabilization means from the camera attachment means.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

Leash Detail

The inventor has discovered further embodiments of the instant invention that can be used as animal leashes. These embodiments are shown in FIGS. 2A, 4A, and 5 and described herein, with details of elements shown in other figures.

FIG. 2A shows a perspective view of a dog leash 200 comprising a strap 202 having a length extending between first 204 and second 206 ends (second end 206 shown in FIG. 2B). The strap 202 is folded along its longitudinal axis α-α to create a primary loop 210 defined by the strap. The first end 204 of the strap comprises a terminating end 209. Collar attachment hardware 212 is fixed to the terminating end 209.

The collar attachment hardware 212 can be any reversibly attachable clips that are robust enough to remain attached to an animal's collar. Exemplary collar attachment means include quick-detach or quick-release clips, swivel shackles, snap shackles, and combinations thereof. The collar attachment hardware may comprise any reversibly attachable clips that are robust enough to remain attached to a hanging camera. Exemplary clips include quick-detach or quick-release clips, swivel shackles, snap shackles, and combinations thereof.

The leash 200 features a loop diameter adjustment mechanism 214 positioned intermediate a primary loop of strap 210 having a diameter D and the terminating end 209 of the strap. A fully assembled leash 200 features a slack portion 216 of strap 202 extending a length/between the terminating end 209, and the adjustment mechanism discussed below 214. The adjustment mechanism comprises hardware to reversibly fix the diameter D of the primary loop 210 of the leash 200 and the length of the slack portion of the strap.

A salient feature of this embodiment 200 is the loop diameter adjustment mechanism 214. The adjustment mechanism 214 and its interaction with the strap 202 are shown in FIGS. 3A-C. In an embodiment, the adjustment mechanism is a semi-circular ring 300 whose interior is divided into a first void 302 and a second void 304 by a medially positioned rib 306. The medially positioned rib 306 has a superior surface (upward facing in FIG. 2B) 308 and depending surface (downward-facing in FIG. 2B) 310.

In use, the second end 206 of the strap 202 is attached to or secured adjacent to the depending surface 310 of the medially positioned rib. FIG. 3B shows an attachment configuration wherein opposite ends 312 and 314 of a second strap 316 are inserted into opposite voids 302, 304 of the adjustment mechanism until there is little to no slack in the second strap. When the ends of the second strap 316 are fully inserted into the adjustment mechanism 214, they are fixed to opposing sides 318, 320 of the primary strap 202 using fastening members 321. Any hardware capable of joining two portions of trap is suitable for use as fastening members. Exemplary hardware are rivets, nails, screws, and combinations thereof.

When the second strap ends 312, 314 are secured to the primary strap 202, the first end 204 of the primary strap is fed into the first void 302 of the adjustment mechanism, over the superior surface 308 of the medially positioned rib 306 and into the second void 304 of the adjustment mechanism. A user can then reversibly insert as much of the primary strap's length as desired into the second void of the adjustment mechanism. As shown in FIG. 3C, the length of strap between the second end of the primary strap and where the strap enters the first void of the adjustment mechanism defines the primary loop of the strap. The length of strap exiting the second void of the adjustment mechanism is the slack length 216.

In the exemplary embodiment of FIGS. 3A-C, the combined depth of the primary and secondary straps stacked on top of each other is sufficient to cause friction with the semicircular ring comprising the buckle. The friction generated between the straps and buckle is sufficient to maintain the diameter D of the primary loop of strap 210 and length of slack strap 216 without intervention of the user. The friction is sufficient to maintain the diameter D and length of slack strap even when the instant invention is in use and attached to a dog. At the same time, a user can quickly manipulate the strap 202 and adjustment mechanism to change the diameter D and length of slack strap 216.

While use of a second strap to attach or maintain the second end of the primary strap adjacent to the depending surface of the medially positioned rib is shown and described herein, this is an exemplary attachment means and not meant to be limiting. Any suitable materials or methods can be used to attach or position the second end of the primary strap adjacent to the medially positioned rib of the adjustment mechanism. As discussed below, this configuration enables a user to easily increase the diameter of the primary loop of strap and reduce the slack length or vice versa. Exemplary materials and methods include gluing, welding, and a combination thereof.

FIGS. 3A-C shows a cinch shackle as an exemplary adjustment mechanism 214. Any hardware capable of receiving the ends of the strap and reversibly engaging with the strap to fix the diameter of the primary loop and the slack portion of the strap is suitable for use as an adjustment means. A person having ordinary skill in the art will understand that the structural configuration between the strap and adjustment mechanism will vary depending on the adjustment mechanism used. FIG. 2B shows a detail view of a cinch shackle. In use, a user can adjust the diameter of the main loop of strap and the slack length however they choose to accommodate their preferences. Using the adjustment mechanism, the strap 202 can be interchangeably placed into three different configurations as shown in FIGS. 2C-2E.

FIG. 2A shows the adjustment mechanism 214 as a cinch shackle. Suitable cinch shackles are the square shackle available from the CN Dyne Company of Dongying, China. The adjustment mechanism reversibly engages the strap. After engagement, it reversibly fixes the diameter of the primary loop of strap 210 and provides a user with the ability to adjust said diameter. In use, the wearer of the leash 210 can interact with and reversibly disengage the adjustment mechanism and pull a portion of the slack length of the strap through the mechanism 214 to make the diameter of the primary loop D bigger. Alternatively, a user can interact with and reversibly disengage the adjustment mechanism and reduce the diameter D of the loop of the strap by pulling the terminating end 209 of the strap. A suitable adjustment means can receive the ends of the strap 202 and reversibly engage with the strap such that the length l of the slack portion and diameter of the primary loop are fixed. A user can reversibly disengage said adjustment mechanism to allow for adjustment of the diameter of the primary loop of strap and the length of the slack portion of strap. Suitable alternative adjustment means include double loops, sliders, cinch buckles, slip locks, and combinations thereof.

FIG. 2C shows the strap 200 in a first configuration 220. This configuration 220 features the strap 200 worn in a shoulder-sling configuration in which the strap extends diagonally from one shoulder toward the hip opposite the overlaid shoulder. As shown in FIG. 2C, in this first configuration 220, the adjustment mechanism is positioned adjacent to the hip of the user with the slack portion of the strap hanging therefrom.

In this shoulder sling configuration, a user can reversibly attach the collar attachment hardware 212 to attachment hardware 222 on the collar 224 worn by a dog or other animal 226. Any hardware suitable for temporary engagement to the collar attachment hardware is suitable. After attachment of the attachment hardware 212 on the strap to the collar of an animal, the animal is free to move with or relative to a user of the strap. When the collar 224 of an animal is attached to the attachment hardware on the strap, the animal is prevented from moving farther away from the user of the strap than the length of the slack portion of the strap and is thus prevented from running away from or straying too far away from a user. At the same time, the attached animal can move along with the user of the strap while walking, running, hiking, or any other sort of activity regardless of the vigorousness of the user's movement.

In this configuration, the shoulder of the user prevents the strap from sliding downwardly along the trunk of the user. As mentioned above, a user can adjust the diameter of the primary loop of the harness to any length desired. This feature can be used by a wearer of the shoulder sling configuration to make the strap fit as tightly around their shoulder, chest, and back as they desire. The tighter the user makes the harness around their body, the less the strap will move on the user's body. A user may desire to make the harness tight enough to prevent lateral movement of the strap into user's neck in response to movement of an attached animal. After attachment to the shoulder harness to an animal's collar, an animal can be reversibly released from attachment to the strap by releasing the attachment hardware 212 on the strap from the attachment hardware 222 on the collar 224 of the animal.

In another embodiment 230 as shown in FIG. 2D, a user places the primary loop of the strap over their head, and then shoulders and positions the strap such that the primary loop of the strap extends approximately horizontally around a user. In this configuration, a user may tighten (reduce the diameter of the primary loop of the strap) such that the strap fits snugly around the trunk of the user. A user may position the tightened strap to extend horizontally across their body at any position along their trunk, including around the wearer's waist. Preferably, the strap is positioned along a user's trunk at any position superior to the hips such that the lateral protrusion of the hip bones prevents the strap from being pulled downward farther than the hips of the user. For example, a user can position the horizontally positioned strap 230 so that the strap overlays the user's waist, or, alternatively, sits just superior to their hips.

Similarly to the shoulder-sling embodiment shown in FIG. 2C, in use, a user attaches the attachment hardware of the strap to the attachment hardware 222 on the collar 224 of a dog or other animal. As with the embodiment featured in FIG. 2C, an animal attached to the horizontally positioned strap is prevented from moving farther away from a user than the length of the slack portion of the strap. However, as with the shoulder-sling embodiment above, an animal reversibly attached to the horizontally worn version of the strap is free to move with the user of the strap and can be reversibly released from the strap whenever desired.

A third embodiment 240 of the strap shown in FIGS. 2A-D is depicted in FIG. 2E. In this embodiment, a user uses the adjustment mechanism on the strap to reduce the diameter of the primary loop of strap to provide a greater slack length than in either the shoulder or horizontally worn configurations and a primary loop smaller in diameter than in the above-embodiments. This third embodiment can be adjusted to fit the wrist or hand of a user similar to conventional leashes. Similarly to the above-described embodiments, this embodiment 240 can be reversibly attached to the collar of a dog or other animal such that the distance an animal can move away from a user is limited by the length of the slack portion of the strap.

An advantage of the strap shown in FIGS. 2A-E is that a user can use the strap to reversibly anchor a dog or other animal to their person when the attachment hardware on the strap are attached to the attachment hardware on an animal's collar but can also use the strap to reversibly anchor the dog to stationary objects of varying diameters or even irregularly stationary objects. As such, a user can adjust the length of the diameter of the primary loop of strap to fit a stationary object of any size or configuration should a user desire to reversibly limit the movement of a dog or animal attached to the strap away from said object.

While FIGS. 2A-E are described as various embodiments of a dog leash design, the adjustment mechanism utilized allows for a user to adjust the diameter of the primary loop of strap and length of the slack portion of the strap at will. This allows for a user to quickly adjust the strap to and between the configurations shown in FIGS. 2A-E or any other configuration desired.

FIGS. 4A-4B depict a leash 350 for use with the shoulder sling shown in FIGS. 1A, 1B, and 1F. This leash 350 is configured for use with the shoulder sling of FIGS. 1A, 1B, and 1F, wherein the stabilizing strap 44 features a leash attachment 352 that is in slidable communication along the length of the stabilizing feature between its first 46 and second ends 48. In this configuration, the stabilizing strap 44 is received by slider hardware 354, wherein the strap 202 comprising the leash attachment 352 is also received by the slider hardware 354. As shown in FIG. 3A, the slider hardware is a square shackle available from the CN Dyne Company of Dongying, China. The square shackle is exemplary and not meant to be limiting. Any hardware suitable for receiving the stabilizing strap, the leash attachment, and allowing the leash attachment to slide along the length of the stabilizing strap is suitable. Exemplary slider hardware includes D rings, O Rings, Roller Buckles, Center Bar Buckles, Metal Loops, Double Loops, Snap Shackles, and combinations thereof.

FIG. 4B shows a detail view of the leash attachment 352. Looking to FIG. 4B, the leash attachment 352 is nearly identical in structural configuration to the leash shown in FIGS. 1A-1B but for the addition of the slider hardware 354 to the primary loop 210 of the leash attachment. As mentioned above, the slider hardware 354 receives the primary loop of strap 210 of the leash attachment 352. With the strap of the leash attachment inserted into the slider hardware, the slider hardware can freely slide along the length of strap defining the primary loop 210 of the leash attachment until it comes into contact with the adjustment mechanism 214.

A user wearing the leash embodiment 350 depicted in FIGS. 4A-4B user can connect the collar attachment hardware 212 to the attachment hardware 214 on the collar 224 of a dog or other animal. Once the animal is thus connected to the leash, the animal is prevented from moving farther than the total length line a-a of the leash attachment when it is pulled completely taught. When desired, the animal can be released from the leash 350 by disconnecting the collar attachment hardware 212 from the attachment hardware 222 on the animal's collar.

Leash embodiment 350 is shown as used with the shoulder sling shown in FIGS. 1A-1B. This is exemplary and not meant to be limiting. When, as shown in FIG. 4A, the leash embodiment is configured as shown with the stabilizing strap 44 slidably engaged to the slider hardware 354, the ends of the stabilizing strap 44 can be clipped to any suitable attachment point or hardware by using the clips 50 at each end of the stabilizing strap. The slider hardware acts as anchoring hardware.

Similarly, the slider hardware on the leash attachment 352 is suitable for receipt of any strap or desired hardware. A person having ordinary skill in the art will see that the leash attachment 352 can be slidably received by any strap having a length. Or alternatively, a user can attach various hardware to the slider hardware 354 on the leash attachment 352 wherein that hardware may or may not be movable.

An alternative leash attachment 400 to that shown in FIG. 3A is shown in FIG. 5. This embodiment features slider hardware 402 allowing for reversible attachment to the stabilizing strap 44 of the shoulder sling shown in FIG. 1A-1B. The exemplary embodiment shown in FIG. 5 shows the slider hardware as the ring 64 with notch 88 shown in FIG. 1E and described above. Using the leash configuration 400 shown in FIG. 5, a user can reversibly insert the stabilizing strap 44 into the notch 88 of the ring 64 comprising the slider hardware. An advantage of this configuration is that the leash 400 can be reversibly attached to the stabilizing strap of the invented shoulder sling or any other fabric or object that can fit within the notch of the ring 88. An animal can be anchored to any strap, device, or object that can be received by the slider hardware 402. Objects suitable for attachment to the hardware 402 can be called anchoring objects. Additionally, the slider hardware of this embodiment 400 can be used to reversibly attach to metal hardware such as the D-Rings 42 discussed above or belt-mounted hardware such as a metal ring integrally attached to a user's belt. An additional advantage of this leash embodiment is that a user can connect as many leash attachments as desired to a receiving device or multiple receiving devices. For example, a user of the shoulder sling shown in FIGS. 1A-1B can attach a plurality of the leash attachments 400 shown in FIG. 5 to the stabilizing strap 44 of the shoulder sling. A user of this leash attachment 400 can attach as many individual leash attachments 400 to a desired attachment point or object. This feature is advantageous for a user that has more than one animal to leash using the leash attachment 400 or a user that leashes a different number of animals at different times.

FIG. 5 shows the leash attachment 400 as using the notched ring 64 shown as the means to reversibly attach the leash attachment 400 to an attachment point. This is meant to be exemplary and non-limiting. Any hardware capable of reversibly attaching to fabric, d-rings, circular metal rings or other attachment points are suitable for use as attachment means in the embodiment 400 shown in FIG. 5. Exemplary attachment means include quick-detach or quick-release clips, swivel shackles, snap shackles, and combinations thereof.

Any leash embodiment shown and discussed in the instant application can use more than one adjustment mechanism. For example, the embodiments shown in FIGS. 2A-E, 4A-B, and 5 feature a primary adjustment mechanism for setting the diameter of the loop of strap. A user can add another adjustment mechanism to a deployed leash such that the primary adjustment mechanism roughly sets the diameter of the loop of the strap, and wherein the user installs a secondary adjustment mechanism to more finely adjust the diameter of the loop of strap. A suitable secondary adjustment mechanism is the stabilizing mechanism 52 shown in FIG. 1E and described above. In this embodiment, a user can attach the clip 60 of the stabilizing feature 52 to the leash such that the clip receives both ends of the strap 202 before it enters the adjustment mechanism (i.e. the clip is positioned intermediate the user and the adjustment mechanism). In this configuration, the user can slide the stabilizing feature 52 toward or away from themselves to finely tune the diameter of the primary loop. This feature can be used to assure that any of the leash embodiments fit tightly against a user's hip, waist, or wrist.

The leash embodiments shown in FIGS. 2A-2E, 4A-4B, and 5 are all shown having adjustment mechanisms. One having ordinary skill in the art understands that any of the leash embodiments described herein and shown in the accompanying drawings can be made to a user's specification and without an adjustment mechanism. In configurations without adjustment mechanisms, the diameter of the primary loops of strap and lengths of slack strap are fixed and cannot be adjusted.

All leash embodiments discussed herein share a salient feature of offering hands-free use. Every leash shown in the figures and discussed above allows for a user to limit the movement of a leashed dog or another animal without requiring that the user to hold the leash. Each embodiment provides for a leash that can be attached to an attachment point on a person, a person's clothing, or an object that then leaves the user's hands both free and available to perform other tasks while the dog or other animal is leashed.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A leash comprising:
a length of strap extending between a first and second end along a longitudinal axis, wherein the strap is folded along said longitudinal axis to form a loop of strap having a diameter;
a strap length adjustment mechanism attached to the strap intermediate the loop and a terminating end of the strap, wherein the terminating end is attached to attachment hardware configured to reversibly receive a collar of an animal, and the adjustment mechanism having a length fixing configuration and an adjustment configuration, wherein the length fixing configuration is configured to prevent changes in the lengths of the loop of strap and the length of slack strap, and wherein the adjustment configuration is configured to allow for adjustment of the diameter of the loop of strap and the length of slack strap, and the adjustment mechanism comprising a means for toggling between its length fixing and adjustment configurations; and
a length of slack strap extending between the adjustment mechanism and the terminating end.

2. The leash of claim 1 wherein the leash has a waist-worn configuration wherein the loop of strap encircles a user trunk in a position intermediate the user's hips and arms of said user.

3. The leash of claim 2 wherein the leash has a shoulder-sling configuration wherein the loop of strap overlays a shoulder of the user and extends downwardly across a front and back of said user toward the hip of the user opposite the overlaid shoulder.

4. The leash of claim 3 wherein the leash has a wrist-worn configuration wherein the loop of strap encircles the wrist of a user.

5. The leash of claim 4 wherein the adjustment mechanism provides a mechanism to reversibly interchange between the waist-worn, shoulder-sling, and wrist-worn configurations.

6. The leash of claim 3 further comprising an anchoring hardware encircling the strap comprising the loop of strap, wherein the anchoring hardware is in slidable communication along a circumference of the loop of strap.

7. The leash of claim 6 wherein the anchoring hardware is configured to reversibly receive an anchoring object.

8. The leash of claim 7 wherein the anchoring object is a strap having a length and wherein the anchoring clip is in slidable communication along the length of said strap when the strap is received by the anchoring clip.

9. The leash of claim 8 wherein the anchoring object is hardware integrally associated with the user's belt.

10. The leash of claim 1 wherein said leash is hands-free.

11. A shoulder sling for carrying equipment and reversibly limiting the movement of the equipment, comprising:
a first strap configured to overlay a shoulder of a user and extend downwardly across a front and back of said user toward a hip of the user opposite the overlaid shoulder;
a first attachment point positioned on the first strap where the first strap overlays an anterior portion of the user's shoulder;
a second attachment point positioned on the first strap where the first strap overlays a posterior portion of the user's shoulder;
a second strap configured to attach the first attachment point on one end and extend diagonally upwardly over the back of the user to attach on the second attachment point; and
one of the two or both of the stabilizing features as following:
the first stabilizing feature comprising a stabilizing strap having a length extending between a first end and a second end, wherein each end of the stabilizing strap comprises a clip, wherein the clips are reversibly attached to the attachment points on the first strap; and
the second stabilizing feature comprising an anchoring object integrally associated with the user's belt, wherein the anchoring object is in slidable communication along the length of the user's belt at its first end and attaches to the equipment at its second end.

12. A wearable leash attachment attached to a stabilizing strap such that the leash attachment is in slidable communication along the length of the stabilizing strap, wherein the leash attachment further comprises a terminating end having a means for attaching to a collar of an animal, and the wearable leash attached comprising:
a length of strap extending between a first and second end along a longitudinal axis, wherein the strap is folded along said longitudinal axis to form a loop of strap having a diameter;
a strap length adjustment mechanism attached to the strap intermediate the loop and a terminating end of the strap, wherein the terminating end is attached to attachment hardware configured to reversibly receive a collar of an animal, and the adjustment mechanism having a length fixing configuration and an adjustment configuration, wherein the length fixing configuration is configured to prevent changes in the lengths of the loop of strap and the length of slack strap, and wherein the adjustment configuration is configured to allow for adjustment of the diameter of the loop of strap and the length of slack strap, and the adjustment mechanism comprising a means for toggling between its length fixing and adjustment configurations; and
a length of slack strap extending between the adjustment mechanism and the terminating end.

13. The second strap of claim 12 wherein the length of the second strap is adjustable to fit the user.

14. The second strap of claim 12 wherein an equipment slider is in slidable communication with the second strap at the first end and reversibly coupled to an equipment.

15. The second stabilizing feature of claim 14 comprising a waist attachment clip at the first end wherein the waist attachment can reversibly receive the user's waistband or belt, where the equipment is stabilized when the waist attachment is clipped at the user's belt and free to move after the waist attachment is unclipped.

16. The wearable leash in claim 15 wherein a slider hardware that is in slidable communication along the length within the loop of the wearable leash and either reversibly or irreversibly communicate with the stabilizing strap.

17. The first stabling feature of claim 14 wherein the ends of the stabling strap may be reversibly changed in two positions by clipping one of the ends on either the first strap or the equipment slider, where the equipment is stabilized when clipping to the equipment slider and free to move after the feature is unclipped to the equipment slider.

18. The stabling features of claim 14 wherein said features are hands-free.

19. The leash of claim 12 wherein said leash is hands-free.

* * * * *